United States Patent [19]

Sasaki et al.

[11] Patent Number: 4,626,295

[45] Date of Patent: Dec. 2, 1986

[54] METHOD OF PRODUCING ALUMINUM ALLOY STRUCTURES

[75] Inventors: Kantaro Sasaki, Ashiya; Shosuke Iwasaki, Kobe; Tetsuo Abiko, Osaka; Yoshio Baba, Nagoya; Michiki Hagiwara, Nagoya; Keizo Nanba, Nagoya, all of Japan

[73] Assignee: Sumitomo Precision Products Co., Ltd., Hyogo, Japan

[21] Appl. No.: 727,775

[22] Filed: Apr. 26, 1985

[51] Int. Cl.$^4$ .............................................. C21D 1/00
[52] U.S. Cl. ................................ 148/127; 29/DIG. 4; 29/157.3 A; 29/157.3 B; 29/726; 148/24; 148/126.1; 228/223; 228/231; 228/263.17; 428/650

[58] Field of Search ................... 419/47; 428/670; 148/126.1, 127, 23, 24, 26; 29/157.3 B, 157.3 A, DIG. 4, 726; 228/223, 231, 263.17; 165/DIG. 8

[56] References Cited

U.S. PATENT DOCUMENTS 3,951,328  4/1976  Wallace et al. ...................... 228/223
4,214,925  7/1980  Arita et al. ............................ 148/127

Primary Examiner—Stephen J. Lechert, Jr.
Attorney, Agent, or Firm—Oblon, Fisher, Spivak, McClelland & Maier

[57] ABSTRACT

A brazing method is disclosed which provides superior strength in the brazed joint formed. The brazed structure is subjected to a heat treatment after brazing, which improves the strength of the joint even if Magnesium compounds are employed.

5 Claims, 6 Drawing Figures

METHOD OF PRODUCING ALUMINUM ALLOY STRUCTURES

BACKGROUND OF THE INVENTION

1. Field of the Invention

In recent years, aluminum alloy structures that have resistance against high pressures have been widely used in various applications including heat exchangers for natural gases. To meet such demands, it has been necessary to increase the strength of the exchangers against high pressure encountered. The present invention relates to a manufacturing method which helps increase the strength of joint portions by improving a solidified structure at brazed joint portions formed by brazing aluminum alloy structures.

2. Background of the Prior Art

To date, brazing materials used for brazing aluminum alloy structures are generally composed of an Al-Si type alloy when it is to be brazed with flux, or is composed of an Al-Si-Mg type alloy when it is to be brazed without flux. However, the joint formed by using such brazing materials provides a solidified structure which includes a eutectic structure, and is brittle. In particular, when a brazing material of the Al-Si-Mg type is used or when the base metal contains magnesium, the brazed joint further loses the strength.

Study has so far been conducted extensively to reinforce the brazed joints. In the case of a plate-fin type heat exchanger, for example, limitations are imposed on the size of the brazed portions of fins though it may vary depending upon the shape of protuberance of fins, amount of brazing material supplied, properties of the brazing material, and the like. In treating the plate-fin type heat exchangers, furthermore, a method has been proposed to increase the strength against the pressure relying upon the aging and hardening of a base metal of the Al-Mg-Si type by using a heat-treated aluminum alloy as a fin material, effecting a solution heat treatment thereof after the brazing, and thereafter effecting hardening and tempering. According to this method, however, the base metal is limited to a heat-treated aluminum alloy (Japanese Patent Publication No. 11948/1982).

SUMMARY OF THE INVENTION

Unlike the above-mentioned methods, an object of the present invention is to provide a manufacturing method which increases the strength of the solidified structure of the brazed joint portions formed by brazing aluminum alloy structures with flux or without flux, based on an idea that with the high-pressure plate-fin type heat exchanger which requires large strength in the joints, it is essential to increase the strength of the structure of brazed joints of fins.

The inventors have investigated the joint structure from various viewpoints, and have found that silicon is crystallized in the form of needles, magnesium is segregated conspicuously, and magnesium is bonded to aluminum, silicon and iron to form compounds that are hard and brittle. A pressure was applied into the heat exchanger to break the brazed portions of fins by tensile or shearing force. Observation of the broken surfaces through a scanning electron microscope revealed the formation of the above-mentioned compounds in large amounts.

Based upon the above results, the inventors have conducted extensive tests to improve the structure in an attempt to strengthen such brittle solidified structures, and have discovered an improved method which helps obtain the superior results as described below.

The current invention resides in a method of producing aluminum alloy structures characterized in that an aluminum alloy structure is heated at a temperature of 500° to 570° C. for at least one hour, said aluminum alloy structure being obtained by the combination of brazing sheets formed by cladding both surfaces of a core member with a brazing material and a fin member made of an aluminum alloy which has not been treated with heat.

| 1 - brazing sheets | 2 - fins |
| 3 - brazing material | 4 - spacer bars |
| 5 - test paths | 6 - dummy paths |
| 7 - core members | |

DESCRIPTION OF THE INVENTION

Based upon a standpoint that a brazed joint portion resembles a cast structure that has been melted, cooled and solidified, the inventors have achieved the method of the present invention. The inventors have investigated the structure obtained when a joined portion of a brazing member JIS-BA 4004 and a base member JIS-A 3004 is subjected to homogenization (heat treatment at a temperature of 500° to 570° C. for at least one hour) or not subjected to such a treatment, and have observed changes as illustrated in FIGS. 1 to 4.

Figure 2:
FIG. 2 is a micrograph with a magnification of 400 times showing granulated silicon crystals in a joint when the method of the present invention is put into practice.
Figure 4:
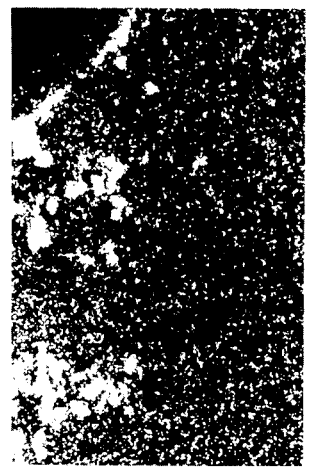
FIG. 4 is a photograph with a magnification of 250 times of an EPMA characteristic X-ray image showing a metal structure in which magnesium is dispersed in a joint when the method of the present invention is put into practice.
Figure 1:
FIG. 1 is a micrograph with a magnification of 400 times showing needle-like silicon crystals in the eutectic structure in a joint when the method of the present invention is not put into practice.
Figure 3:
FIG. 3 is a photograph with a magnification of 250 times of an EPMA characteristic X-ray image showing a metal structure in which magnesium is segregated in a joint when the method of the present invention is not put into practice.

That is, needle-like crystals of silicon in the eutectic structure shown in FIG. 1 prior to the homogenization are granulated as shown in FIG. 2 through the homogenization effected at 540° C. for four hours. Magnesium in the eutectic structure shown in FIG. 3 prior to the homogenization is transformed into a solid solution with other elements as shown in FIG. 4 through the homogenization effected at 540° C. for four hours. It is further observed that compounds containing magnesium are scattered. The above-mentioned transformations help increase the toughness of the joint structure and increase the strength of the whole joint against breaking by tensile force or shearing force such as through applied internal pressure.

obtained brazed joints of fins of a strength higher than the ultimate strength of fins.

TABLE 1

| Brazing method | Brazing material | Base metal (fin material) | Heat-treating condition | Pressure for burst test sample | Broken portion | Remarks |
|---|---|---|---|---|---|---|
| Flux Brazing | 4047 | 1100 | none | 320 kg/cm² (G) | fins | joint strength not confirmed |
| | | | 500° C. × 1 Hr | 326 | " | joint strength not confirmed |
| | | | 570° C. × 24 Hr | 319 | " | joint strength not confirmed |
| | | 3003 | none | 362 | fins | |
| | | | 500° C. × 1 Hr | 383 | " | joint strength not confirmed |
| | | | 570° C. × 24 Hr | 370 | " | joint strength not confirmed |
| | | 3004 | none | 355 | joints | |
| | | | 500° C. × 1 Hr | 508 | fins | joint strength not confirmed |
| | | | 570° C. × 24 Hr | 515 | " | joint strength not confirmed |
| | | 5005 | none | 267 | joints | |
| | | | 500° C. × 1 Hr | 416 | " | |
| | | | 570° C. × 24 Hr | 430 | " | |
| Fluxless Brazing | 4004 | 1100 | none | 292 kg/cm² (G) | joints | |
| | | | 500° C. × 1 Hr | 320 | fins | joint strength not confirmed |
| | | | 570° C. × 24 Hr | 325 | " | joint strength not confirmed |
| | | 3003 | none | 314 | joints | |
| | | | 500° C. × 1 Hr | 383 | fins | joint strength not confirmed |
| | | | 570° C. × 24 Hr | 381 | " | joint strength not confirmed |
| | | 3004 | none | 344 | joints | |
| | | | 500° C. × 1 Hr | 500 | " | |
| | | | 570° C. × 24 Hr | 528 | fins | joint strength not confirmed |
| | | 5005 | none | 190 | joints | |
| | | | 500° C. × 1 Hr | 399 | " | |
| | | | 570° C. × 24 Hr | 407 | " | |

It was confirmed that the above transformation can also be obtained in the same way as described above even when the homogenization is effected after the joint has been brazed but while the joint is being cooled, or even when the homogenization is effected after the joint which has been brazed is cooled near to room temperature and is heated again under appropriate conditions. This invention can be further understood by reference to the examples set forth below.

EXAMPLES

Figure 5:
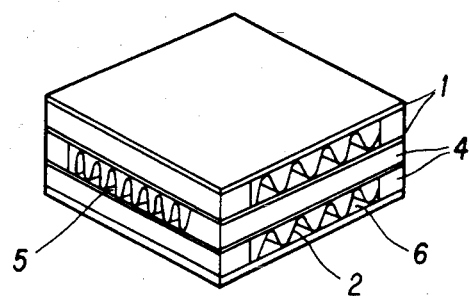
FIG. 5 is a perspective view of a plate-fin type heat exchanger that was put to the burst test.
Figure 6:
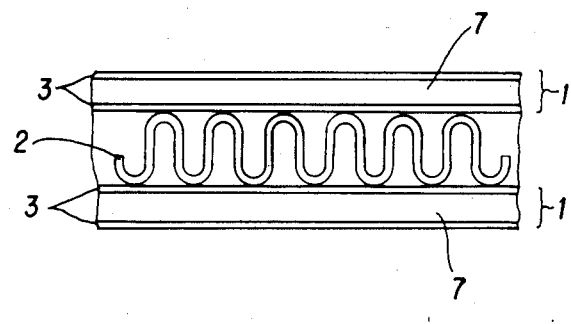
FIG. 6 is a front view showing a portion of FIG. 5 on an enlarged scale.

Heat exchangers of the plate-fin structure shown in FIG. 5 were produced by flux brazing or fluxless brazing in accordance with the method of the present invention. High pressure was applied thereinto to carry out bursting test. In FIG. 5, reference numeral 1 denotes brazing sheets, 2 denotes fins, 3 denotes a brazing material, 4 denotes spacer bars, and 5 denotes test paths. As for the flux brazing, a brazing material JIS-BA 4047 was used in combination with various aluminum alloy fin materials which had not been treated with heat. As for the fluxless brazing, a brazing material JIS-BA 4004 was used in combination with various aluminum alloy fin materials which had not been treated with heat.

The test results were as shown in Table 1. When the method of the present invention was put into practice, the ultimate strength at the brazed joints of fins was increased by 45% to 114% compared with the case when the method of the present invention was not put into practice. Owing to this improvement, there were As demonstrated above, the present invention offers many effects as described below.

That is, even in the case of large structures in which the brazing is effected under severe conditions and brazed joints of sufficiently large size are not obtained, the method of the present invention makes it possible to increase the strength of joints to meet the purposes. Further, it has been considered that sufficiently strong brazed joints are not obtained with the materials which contain magnesium. By adopting the method of the present invention, however, the strength of brazed joints can be increased to meet the purposes.

With the brazing materials of the Al-Si-Mg type, furthermore, the joints tended to become brittle since magnesium is left in the brazed joints. By adopting the method of the present invention, however, the strength of the joints can be increased to meet the purposes.

According to the present invention, it is possible to produce a heat exchanger made of an aluminum alloy of the plate-fin structure that can withstand the internal pressure of as great as 500 kg/cm² (G), for the first time, relying upon the fluxless brazing method using a brazing material of the Al-Si-Mg type.

What is claimed as new and is intended to be secured by Letters Patent is:

1. A method of producing brazed aluminum alloy structures of high brazing joint strength, comprising:
    forming said joint by brazing using brazing sheets formed by cladding both surfaces of a core member with a brazing material and joining it to a second member comprised of an aluminum alloy which has not been subjected to a heat treatment prior to brazing;

treating the resulting brazed structure at a temperature of 500°–570° C. for at least one hour.

2. The method of claim 1, wherein said heat treatment is maintained for from 1–24 hours.

3. The method of claim 1, wherein said brazing material is comprised of an aluminum alloy consisting essentially of Al, Si, and Mg.

4. The method of claim 1, wherein said aluminum alloy contains Mg.

5. The method of claim 1, wherein said second member is a fin and said core material is a heat exchanger body to which said fin is to be attached.

* * * * *

UNITED STATES PATENT AND TRADEMARK OFFICE
CERTIFICATE OF CORRECTION

PATENT NO. : 4,626,295

DATED : December 2, 1986

INVENTOR(S) : Kantaro Sasaki et al

It is certified that error appears in the above-identified patent and that said Letters Patent is hereby corrected as shown below:

On the Title page:
-- The priority information has been omitted.
It should read:

April 26, 1984 -Japan- 59 85879 --

Signed and Sealed this

Tenth Day of March, 1987

Attest:

DONALD J. QUIGG

*Attesting Officer*  *Commissioner of Patents and Trademarks*